US00H002272H

(19) United States
(12) Statutory Invention Registration
Anderson et al.

(10) Reg. No.: US H2272 H
(43) Published: Nov. 6, 2012

(54) CODE FRAMEWORK FOR GENERIC DATA EXTRACTION, ANALYSIS AND REDUCTION

(75) Inventors: Anne W. Anderson, Fredericksburg, VA (US); Colleen A. Johnson, Fredericksburg, VA (US); Andrew E. Orzechowski, Fredericksburg, VA (US)

(73) Assignee: The United States of America as represented by the Secretary of the Navy, Washington, DC (US)

(21) Appl. No.: 12/586,406

(22) Filed: Sep. 10, 2009

Related U.S. Application Data

(60) Provisional application No. 61/192,869, filed on Sep. 17, 2008.

(51) Int. Cl.
*G06F 11/27* (2006.01)

(52) U.S. Cl. ..... 717/100

(58) Field of Classification Search ..... None
See application file for complete search history.

(56) References Cited

U.S. PATENT DOCUMENTS

| | | | | | |
|---|---|---|---|---|---|
| 5,862,382 | A | * | 1/1999 | Kataoka | 717/131 |
| 6,539,116 | B2 | | 3/2003 | Takaoka | 382/229 |
| 7,225,360 | B2 | | 5/2007 | Kihara | 714/37 |
| 7,418,440 | B2 | | 8/2008 | Kubaitis | 707/3 |
| 7,426,716 | B2 | * | 9/2008 | Kung et al. | 717/123 |
| 8,042,098 | B2 | * | 10/2011 | Do et al. | 717/123 |
| 2004/0221261 | A1 | * | 11/2004 | Blevins | 717/107 |
| 2005/0015745 | A1 | * | 1/2005 | Wain et al. | 717/105 |
| 2007/0240125 | A1 | * | 10/2007 | Degenhardt et al. | 717/129 |
| 2008/0104570 | A1 | * | 5/2008 | Chedgey et al. | 717/105 |
| 2008/0195579 | A1 | | 8/2008 | Kennis et al. | 707/3 |
| 2009/0178031 | A1 | * | 7/2009 | Zhao | 717/143 |
| 2009/0199163 | A1 | * | 8/2009 | Soroker et al. | 717/128 |
| 2010/0077386 | A1 | * | 3/2010 | Akkiraju et al. | 717/136 |
| 2010/0278453 | A1 | * | 11/2010 | King | 382/321 |

OTHER PUBLICATIONS

Systä et al., "Shimba—an environment for reverse engineering Java software systems", Softw. Pract. Exper. 2001; 31:371–394.*

* cited by examiner

*Primary Examiner*—Daniel Pihulic
(74) *Attorney, Agent, or Firm*—Gerhard W. Thielman

(57) ABSTRACT

A system and a method are provided for processing data from a computer that executes an application program. The system includes an extraction engine, a reduction program and an analysis program. The extraction engine retrieves execution data from the application program and records the data to nonvolatile memory as extract data. The reduction program reads the extract data from the memory and reduces the data into human readable format as reduce data. The analysis program analyzes the reduce data in accordance with operator-provided instructions and produces event data that identify at least one sequence associated with the execution data. A management console further displays the implemented processes. The extraction engine can further include a classes assigner for categorizing said execution data into classes. The reduction program can further include a structure builder for formatting said extract data. The reduction program can further include an event layout builder for formatting said event data.

16 Claims, 18 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GeDEAR Usage Example

Figure 1- GeDEAR Usage Example

1000

1010

| Name | Array |
|---|---|
| Description | A type of Displayable object that contains some number of other Displayable objects. At display time, printing an array results in the printing of all Displayable objects contained within it. |
| Implemented By | The GeDEAR framework. |

1020

| Name | Constant |
|---|---|
| Description | A type of Displayable object that wraps the output of a value that is constant during all displays of an event. |
| Implemented By | The GeDEAR framework. |

1030

| Name | Displayable |
|---|---|
| Description | Base class for all run-time displayable objects within an event. This class allows the format of the output to be modified according to run-time defined parameters of alignment, precision and width. |
| Implemented By | The GeDEAR framework. |

1040

| Name | DRP HCI Classes |
|---|---|
| Description | Classes that interact directly with the human user of the DRP. This includes, but is not limited to, the classes to support a graphical user interface, perform filtering of events, and support utilities. |
| Implemented By | The GeDEAR framework. |

1050

| Name | EventDataSource |
|---|---|
| Description | Wraps the low level details of reading extracted event data from a persistent data source. During an execution of the DRP, there may be several different implementations of EventDataSource executing concurrently. |
| Implemented By | End-users of GeDEAR framework inherit from this class to provide specific data format implementations. Instances of this class are created from an instance of EventDataSourceLoader at runtime. |

Fig. 10

1100

1110

| Name | EventDataSourceLoader |
|---|---|
| Description | Wraps the creation of a specific EventDataSource instance from the rest of the DRP. This class is responsible for building a specific type of EventDataSource. During an execution of the DRP, there may be several different implementations of EventDataSourceLoader in existence |
| Implemented By | End-users of GeDEAR framework inherit from this class to provide project specific implementations. These implementations are loaded dynamically at application run-time through the GeDEthe GeDEAR plug-in framework. |

1120

| Name | EventLayou |
|---|---|
| Description | A class that contains the structural layout of an extracted event and details about how to display the various structural elements. |
| Implemented By | The GeDEAR framework. |

1130

| Name | EventLayout::Array |
|---|---|
| Description | The class that defines repeating elements within extracted data. This class allows the DRP to work with repeating data within an extracted event without knowledge of the implementation details. |
| Implemented By | End-users of GeDEAR framework inherit from this class to provide project specific implementations.. Instances of this class are created from an instance of StructureBuilder at runtime. |

Fig. 11

1200

1210

| Name | EventLayout::Field |
|---|---|
| Description | The class that defines an element within extracted data that has some specific type. This type is integer, unsigned integer, string, or floating point. This class allows the DRP HCI to determine the specific type of the value of a field, without knowledge of the implementation details. To obtain the value, see EventLayout::TypedField. |
| Implemented By | End-users of GeDEAR framework inherit from this class to provide project specific implementations. Instances of this class are created from an instance of StructureBuilder at runtime |

1220

| Name | EventLayout::Item |
|---|---|
| Description | Base class for all structural elements of an extracted event. Known descendants are EventLayout::Array and EventLayout::Field. The specific implementation may define additional direct descendants of this class, but these will not be used by the framework. |
| Implemented By | End-users of GeDEAR framework inherit from this class to provide project specific implementations. Instances of this class are created from an instance of StructureBuilder at runtime. |

1230

| Name | EventLayout::Structure |
|---|---|
| Description | Wrapper class to hold high level details about the structure of an extracted event and provide access to those elements. During an execution of the DRP, there may be several different implementations of EventLayout::Structure in existence. |
| Implemented By | End-users of GeDEAR framework inherit from this class to provide project specific implementations. Instances of this class are created from an instance of StructureBuilder at runtime. |

Fig. 12

1300

1310

| Name | EventLayout::TypedField |
|---|---|
| Description | The class that defines an element within extracted data that has some specific value. This class allows the DRP HCI to obtain the value of the field while maintaining type safety without knowledge of the implementation details. To obtain the value, see EventLayout::TypedField. |
| Implemented By | End-users of GeDEAR framework inherit from this class to provide project specific implementations. Instances of this class are created from an instance of StructureBuilder at runtime. |

1320

| Name | Field |
|---|---|
| Description | A type of Displayable object that wraps the output of a value contained within an EventLayout::TypedField. |
| Implemented By | The GeDEAR framework. |

1330

| Name | StructureBuilder |
|---|---|
| Description | Wraps the creation of an EventLayout::Structure. The EventLayout::Structure object accepts an XML Element that contains the implementation specific physical structure of the extracted data and converts it into the implementation agnostic EventLayout::Structure class. During an execution of the DRP, there may be several different implementations of StructureBuilder executing concurrently. |
| Implemented By | End-users of GeDEAR framework inherit from this class to provide project specific implementations. These implementations are loaded dynamically at application run-time through the GeDEAR plug-in framework. |

Fig. 13

1400

1410

| Name | Interface |
|---|---|
| Description | Wraps the low level details of the actual interface from the rest of the ES. This class is responsible for accepting requests from software applications through some type of interface and translating them into requests on the Extraction Engine object. During an execution of the ES, there may be several different implementations of Interface executing concurrently. |
| Implemented By | End-users of GeDEAR framework inherit from this class to provide project specific implementations. These implementations are loaded dynamically at application run-time through the GeDEAR plug-in framework. |

1420

| Name | Extraction Engine |
|---|---|
| Description | Mediates between the instances of the Interface class and the instance of the EventDataSink and controls functionality that is common regardless of the Interface of EventDataSink used. An example of such functionality would be to filter the events that are extracted by the ES at runtime based upon some criteria. |
| Implemented By | The GeDEAR framework |

1430

| Name | EventDataSink |
|---|---|
| Description | Wraps the low level details of writing extracted event data from the rest of the ES application. During an execution of the ES, there is only a single instance of this class in existence. |
| Implemented By | End-users of GeDEAR framework inherit from this class to provide project specific implementations. These implementations are loaded dynamically at application run-time through the GeDEAR plug-in framework. |

Fig. 14

1500

1510

| Name | Console HCI Classes |
|---|---|
| Description | Classes that interact directly with the human user of the MC. This includes, but is not limited to, the classes to support a graphical user interface, reading and writing configuration files, and support utilities. |
| Implemented By | The GeDEAR framework. |

1520

| Name | ServerFactory |
|---|---|
| Description | Wraps the creation of a specific Server instance from the rest of the MC. This class is responsible for providing configuration information about how to connect to a server and validation of server parameters to the MC HCI for a specific type of Server. During an execution of the MC, there may be several different implementations of ServerFactory existing concurrently. |
| Implemented By | End-users of GeDEAR framework inherit from this class to provide project specific implementations. These implementations are loaded dynamically at application run-time through the GeDEAR plug-in framework. |

1530

| Name | Server |
|---|---|
| Description | Wraps the low level details of communicating with a single ES. This class is responsible for interfacing with a specific ES through some well defined interface. From this interface, the Server class retrieves some set of configuration and status information that is displayed to the human user of the MC. During an execution of the MC, there may be several different implementations of Server executing concurrently. |
| Implemented By | End-users of GeDEAR framework inherit from this class to provide project specific implementations. Instances of this class are created from an instance of ServerBuilder at runtime. |

Fig. 15

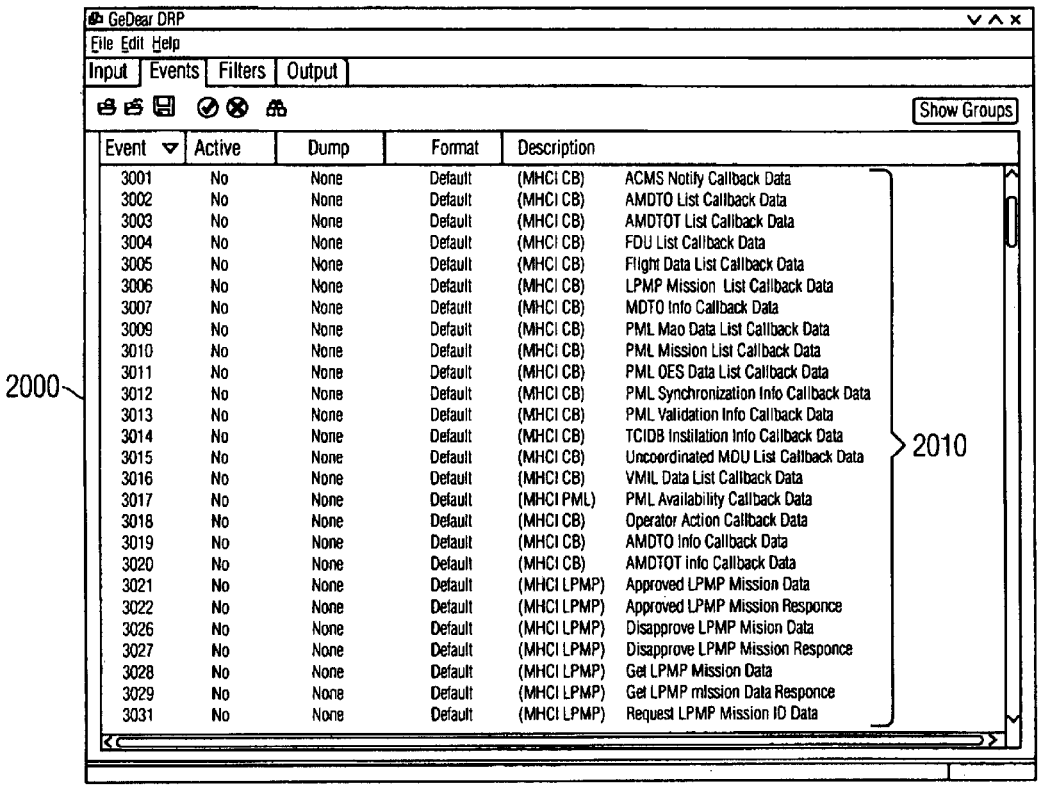

| Event | Active | Dump | Format | Description | |
|---|---|---|---|---|---|
| 3001 | No | None | Default | (MHCI CB) | ACMS Notify Callback Data |
| 3002 | No | None | Default | (MHCI CB) | AMDTO List Callback Data |
| 3003 | No | None | Default | (MHCI CB) | AMDTOT List Callback Data |
| 3004 | No | None | Default | (MHCI CB) | FDU List Callback Data |
| 3005 | No | None | Default | (MHCI CB) | Flight Data List Callback Data |
| 3006 | No | None | Default | (MHCI CB) | LPMP Mission List Callback Data |
| 3007 | No | None | Default | (MHCI CB) | MDTO Info Callback Data |
| 3009 | No | None | Default | (MHCI CB) | PML Mao Data List Callback Data |
| 3010 | No | None | Default | (MHCI CB) | PML Mission List Callback Data |
| 3011 | No | None | Default | (MHCI CB) | PML OES Data List Callback Data |
| 3012 | No | None | Default | (MHCI CB) | PML Synchronization Info Callback Data |
| 3013 | No | None | Default | (MHCI CB) | PML Validation Info Callback Data |
| 3014 | No | None | Default | (MHCI CB) | TCIDB Instilation Info Callback Data |
| 3015 | No | None | Default | (MHCI CB) | Uncoordinated MDU List Callback Data |
| 3016 | No | None | Default | (MHCI CB) | VMIL Data List Callback Data |
| 3017 | No | None | Default | (MHCI PML) | PML Availability Callback Data |
| 3018 | No | None | Default | (MHCI CB) | Operator Action Callback Data |
| 3019 | No | None | Default | (MHCI CB) | AMDTO Info Callback Data |
| 3020 | No | None | Default | (MHCI CB) | AMDTOT info Callback Data |
| 3021 | No | None | Default | (MHCI LPMP) | Approved LPMP Mission Data |
| 3022 | No | None | Default | (MHCI LPMP) | Approved LPMP Mission Responce |
| 3026 | No | None | Default | (MHCI LPMP) | Disapprove LPMP Mision Data |
| 3027 | No | None | Default | (MHCI LPMP) | Disapprove LPMP Mission Responce |
| 3028 | No | None | Default | (MHCI LPMP) | Get LPMP Mission Data |
| 3029 | No | None | Default | (MHCI LPMP) | Get LPMP mission Data Responce |
| 3031 | No | None | Default | (MHCI LPMP) | Request LPMP Mission ID Data |

Fig. 20

GeDear DRP

File Edit Help

Input | Events | Filters | Output

Show Groups

2200

| Event | Active | Dump | Format | Description | |
|---|---|---|---|---|---|
| 3001 | Yes | None | Default | (MHCI CB) | ACMS Notify Callback Data |
| 3002 | Yes | None | Default | (MHCI CB) | AMDTO List Callback Data |
| 3003 | Yes | None | Default | (MHCI CB) | AMDTOT List Callback Data |
| 3004 | Yes | None | Default | (MHCI CB) | FDU List Callback Data |
| 3005 | No | None | Default | (MHCI CB) | Flight Data List Callback Data |
| 3006 | No | None | Default | (MHCI CB) | LPMP Mission List Callback Data |
| 3007 | No | None | Default | (MHCI CB) | MDTO Info Callback Data |
| 3009 | No | None | Default | (MHCI CB) | PML Mao Data List Callback Data |
| 3010 | No | None | Default | (MHCI CB) | PML Mission List Callback Data |
| 3011 | No | None | Default | (MHCI CB) | PML OES Data List Callback Data |
| 3012 | No | None | Default | (MHCI CB) | PML Synchronization Info Callback Data |
| 3013 | No | None | Default | (MHCI CB) | PML Validation Info Callback Data |
| 3014 | No | None | Default | (MHCI CB) | TCIDB Instilation Info Callback Data |
| 3015 | No | None | Default | (MHCI CB) | Uncoordinated MDU List Callback Data |
| 3016 | No | None | Default | (MHCI CB) | VMIL Data List Callback Data |
| 3017 | No | None | Default | (MHCI PML) | PML Availability Callback Data |
| 3018 | No | None | Default | (MHCI CB) | Operator Action Callback Data |
| 3019 | No | None | Default | (MHCI CB) | AMDTO Info Callback Data |
| 3020 | No | None | Default | (MHCI CB) | AMDTOT info Callback Data |
| 3021 | No | None | Default | (MHCI LPMP) | Approved LPMP Mission Data |
| 3022 | No | None | Default | (MHCI LPMP) | Approved LPMP Mission Responce |
| 3026 | No | None | Default | (MHCI LPMP) | Disapprove LPMP Mision Data |
| 3027 | No | None | Default | (MHCI LPMP) | Disapprove LPMP Mission Responce |
| 3028 | No | None | Default | (MHCI LPMP) | Get LPMP Mission Data |
| 3029 | No | None | Default | (MHCI LPMP) | Get LPMP mission Data Responce |
| 3031 | No | None | Default | (MHCI LPMP) | Request LPMP Mission ID Data |

2210

Fig. 22

CODE FRAMEWORK FOR GENERIC DATA EXTRACTION, ANALYSIS AND REDUCTION

CROSS REFERENCE TO RELATED APPLICATION

Pursuant to 35 U.S.C. §119, the benefit of priority from provisional application 61/192,869, with a filing date of Sep. 17, 2008, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to data extraction techniques. In particular, the invention relates to data extraction reduction and analysis, together with interfaces that operate to present the information from the data as events.

Modern software systems typically consist of a large number of interdependent software applications that run simultaneously on one or more physical hardware systems. These applications employ well-defined software interfaces in order to communicate data and invoke commands on remote software processes that enable the proper execution of the software system as a whole. The success of large software systems is directly tied to the correct implementation of these software interfaces.

SUMMARY

Conventional data extraction techniques yield disadvantages addressed by various exemplary embodiments of the present invention. In particular, these suffer from deficiencies related to portability to a variety of platforms.

Various exemplary embodiments provide a system and a method for processing data from a computer that executes an application program. The system includes an extraction engine, a reduction program and an analysis program. The extraction engine retrieves execution data from the application program and records the data to nonvolatile memory as extract data. The reduction program reads the extract data from the memory and reduces the data into human readable format as reduce data. The analysis program analyzes the reduce data in accordance with operator-provided instructions and produces event data that identify at least one sequence associated with the execution data.

In various exemplary embodiments a management console displays the implemented processes. The extraction engine can further include a classes assigner for categorizing said execution data into classes. The reduction program can further include a structure builder for formatting said extract data. The reduction program can further include an event layout builder for formatting said event data.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 10-15 are tabular views of definition lists of parameters and operators; and FIGS. 16-23 are exemplary window views of a scenario that employs the data reduction program.

DETAILED DESCRIPTION

Figure 1:
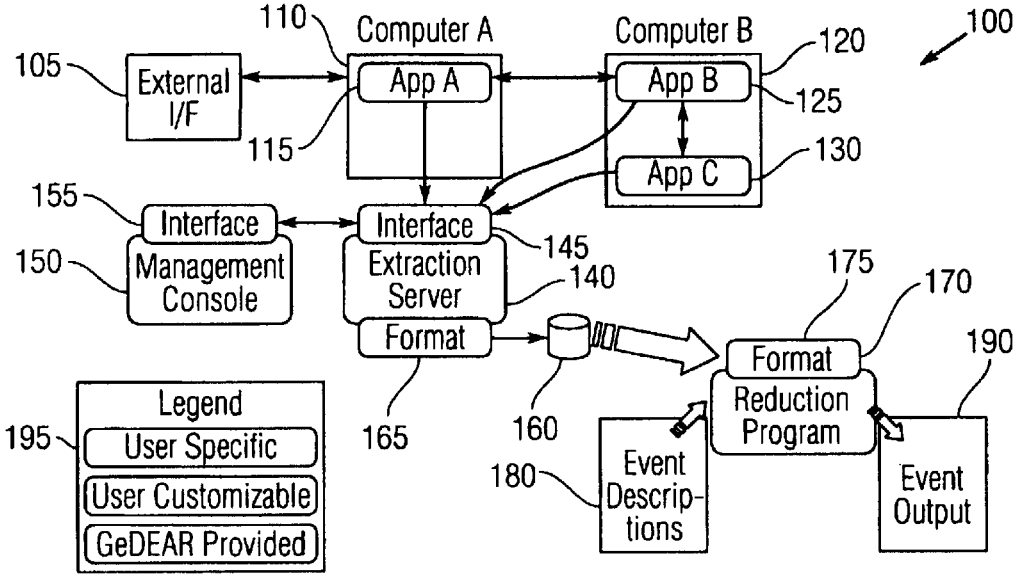
FIG. 1 is a block diagram view of a data extraction process.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized; and logical, mechanical, and other changes may be made without departing from the spirit or scope of the present invention. The following detailed description is, therefore, not to be taken in a limiting sense, and the scope of the present invention is defined only by the appended claims.

The importance of the interfaces used in conventional display systems has led software projects to typically perform data extraction, data reduction, and data analysis. These operations provide verification of the data and command instructions provided via software interfaces, and isolate problems should these occur. Traditionally, software projects have developed support applications that perform the data extraction, data reduction, and data analysis functions required by the project. However, these support applications were focused on the data formats and interfaces used by the particular software project and could not be reused on other projects without expending significant amounts time, money, and resources on code modification, rework, testing, and maintenance.

Various exemplary embodiments provide a software framework that enables data extraction, data reduction and data analysis technology applications across a wide variety of software development projects. The framework clearly and deliberately separates the data extraction, data reduction, and data analysis functions from the specific computer hardware, computer software, interface protocols, and data formats used within a particular software development project. This facilitates the development of additional value-added data extraction, data reduction, and data analysis functions independent of the specific technologies used by a particular software development project.

Additionally, the framework does not enforce the use of a particular set of hardware, software, interface protocols, or data formats on a software development project. The framework executes on a variety of computer hardware running a variety of software operating systems, and allows the end-user (i.e., operator) to control the specific technologies used within their projects without adding additional dependencies upon them. The framework thereby enhances the productivity of software projects by allowing the operator to gain the advantages of data extraction, data reduction, and data analysis technologies without incurring the expense of designing, developing, testing, and maintaining a custom set of tools that implement these functions.

Modern software systems typically consist of a large number of interdependent software applications running simultaneously on one or more physical hardware systems. These applications employ well-defined software interfaces in order to communicate data and invoke commands on remote software processes that enable the proper execution of the software system as a whole. The success of large software systems is directly related to the correct implementation of these software interfaces. Due to the importance of these interfaces, software projects typically perform data extraction, data reduction, and data analysis to verify the data and command provided in software interfaces and to isolate problems if they occur.

Traditionally, a software project supports applications that perform the data extraction, data reduction, and data analysis functions required by the project for a specific platform. However, these support applications have been focused on the data formats an interlaces used by the particular software project and could not be reused on other projects without expending significant amounts time, money, and resources on code modification, rework, testing, and maintenance.

Due to these limitations, development of a set of tools was initiated to overcome these limitations by utilizing the capabilities of the C++ computer programming language, freely available open source software, and object oriented design principles. Their concept involved the development of a framework that clearly separated the data extraction, data reduction, and data analysis functions from the software interlaces and data formats used by these functions. The actual implementation of the software interfaces and data formats would be left to the users of the framework.

The framework itself only contains functionality that is common across multiple software projects, and enables the operator to customize the features specific to their individual needs. Additionally, this framework can be highly portable in order to execute on a variety of computer hardware and software systems. By doing so, the framework could be usable by many different software projects thereby dramatically reducing the time, money, and resources required to implement data extraction, data reduction, and data analysis capabilities in a software system.

A framework called Generic Data Extraction, Analysis and Reduction (GeDEAR) is currently being used by the Tomahawk Weapon Control System and the Littoral Combat Ship: Surface Warfare Mission Package: Module Engagement Controller software systems. The GeDEAR framework is being considered by other programs as well, however at the time of this writing no other formal commitments have been received.

Software systems that utilize data extraction, data reduction, and data analysis capabilities typically organization these functions into several software applications. The first is an application capable of receiving data from other software applications and recording the data to some form of persistent storage. In the GeDEAR framework, this is referred to as the Extraction Server (ES). The second is an application that reads the data from persistent storage, reduces the data into a human readable format, and analyzes the data according to rules specified by the operator. In the GeDEAR framework, this is referred to as the Data Reduction Program (DRP).

Some systems may include an additional application that controls the operation of the ES. In the GeDEAR framework, this is referred to as the Management Console (MC). The interactions between the software system and the data extraction, data reduction, and data analysis capabilities are outlined in the following system example of using the GeDEAR framework.

In this example, the software system consists of two physical hardware machines, computer-A and computer-B. Within these machines, several software applications are executing and communicating with each other. Additionally, one application is communicating with some external interface. This interface may be hardware or software. The ES runs on a machine and records any data provided thereto. The ES stores these data to some persistence (i.e., nonvolatile) storage. Within this configuration, the state of the ES is monitored and controlled from the MC application. At some point in the future, the DRP opens the persistent storage created by the ES, reads the stored events, applies some logic to decode the events, and outputs the events to the operator.

FIG. 1 shows a block diagram 100 of the data extraction technique. An external interface (I/F) communicates with computer-A 110 that executes an executable program application-A 115. The computer-A 110 communicates with computer-B 120 that executes application-B 125 and application-C 130. The computer-A 110 also communicates with an extraction server 140 through an interface block 145. A management console 150 having an interface 155 communicates with the server 140.

Application-B 125 communicates with application-A 115 and application-C 130, and all three programs communicate with the server 140 through the interface block 145. The server 140 provides data to memory storage 160 through a format block 165. The data can be extracted from the storage 160 to a reduction program 170 via a format block 175. The program 170 can receive initial condition information from event descriptions 180 to provide an event output 190.

The external interface 105, applications 115, 125 and 130 are specific to a project that uses the GeDEAR framework, which imposes no additional dependency. The project using GeDEAR is at liberty to implement these sections using any means necessary to complete the project. The server 140, console 150 and program 170 represent core elements of the GeDEAR framework and provide the functionality common across all data formats and interface protocols.

The interface and format blocks 145, 155, 165, 175 are customizable by the operator to meet their specific needs. Within the GeDEAR framework, these are referred to as plug-ins. Although the GeDEAR framework does provide some out-of-the-box reference implementations for these customizable sections, the project using the framework may treat these as optional and thereby may implement its own.

This separation between the interface/format blocks and the core elements in FIG. 1 represents the result of the careful and deliberate isolation of the software interfaces and data formats used by data extraction, data reduction, and data analysis capabilities from the particular data being extracted. This separation provides the GeDEAR framework with the flexibility required to enable generic data extraction, data reduction, and data analysis capabilities.

This enables the GeDEAR framework to focus on providing value-added data extraction, data reduction, and data analysis functions without delving into the intricacies of the underlying software interfaces and data formats.

The components of the GeDEAR framework operate with extracted data through a collection of abstract C++ classes that define the interface that all software interfaces and data formats conform to in order to be supported by the framework. These interfaces are further explained subsequently in this disclosure. From an end-user perspective, these interfaces take the form of plug-ins. These plug-ins can be written by inheritance from a base C++ class and implementing the required C++ methods. The code for the plug-in can be compiled into a standalone library that is loaded dynamically at run-time by the GeDEAR plug-in framework. All of the GeDEAR applications contain support for extension and modification through the use of plug-ins.

The following sections of this document provide additional details of the three main components of the GeDEAR framework, the Data Reduction Program (DRP), Extraction Server (ES), and Management Console (MC). Operators of the various framework components specify the plug-ins to load into the application as well as the software interfaces and data formats that should be used for any given execution of the DRP, ES, or MC through the use of an extended markup language (XML) configuration file. This configuration file is loaded during application startup processing. For example:

```
<drp>
  <plugins>
    <plugin
      location="/usr/lib"
      name="gedear_binary_format" />
    <plugin
      name="gedear_output_mods" />
  </plugins>
  <eventdatasourceloader
    name="GeDear::Plugins::Formats::Binary"
    extension="DX*.dx" />
  <structurebuilder
    name="GeDear::Plugins::Formats::Binary" />
</drp>
```

In this example, the operator instructs the DRP to load two plug-in libraries. The first library is the named "gedear_binary_format" and is located in /usr/lib. The second library is named "gedear_output_mods" and located in the current working directory.

The default EventDataSourceLoader can be set to "GeDear::Plugins::Formats::Binary" as the type. Additionally the DRP is informed the file extension of this file type is in the format "Dx* . dx" This example also sets the default StructureBuilder to the type "GeDear::Plugins::Formats::Binary".

There are no dependences between the components of the GeDEAR framework. The DRP may be used to reduce and analyze data that were not extracted from the ES, and the ES does not require use of the DRP for reduction and analysis. Likewise, the ES does not require the MC be used to monitor and control it. The GeDEAR framework does not make use of any custom written inter-application protocols.

Figure 2:
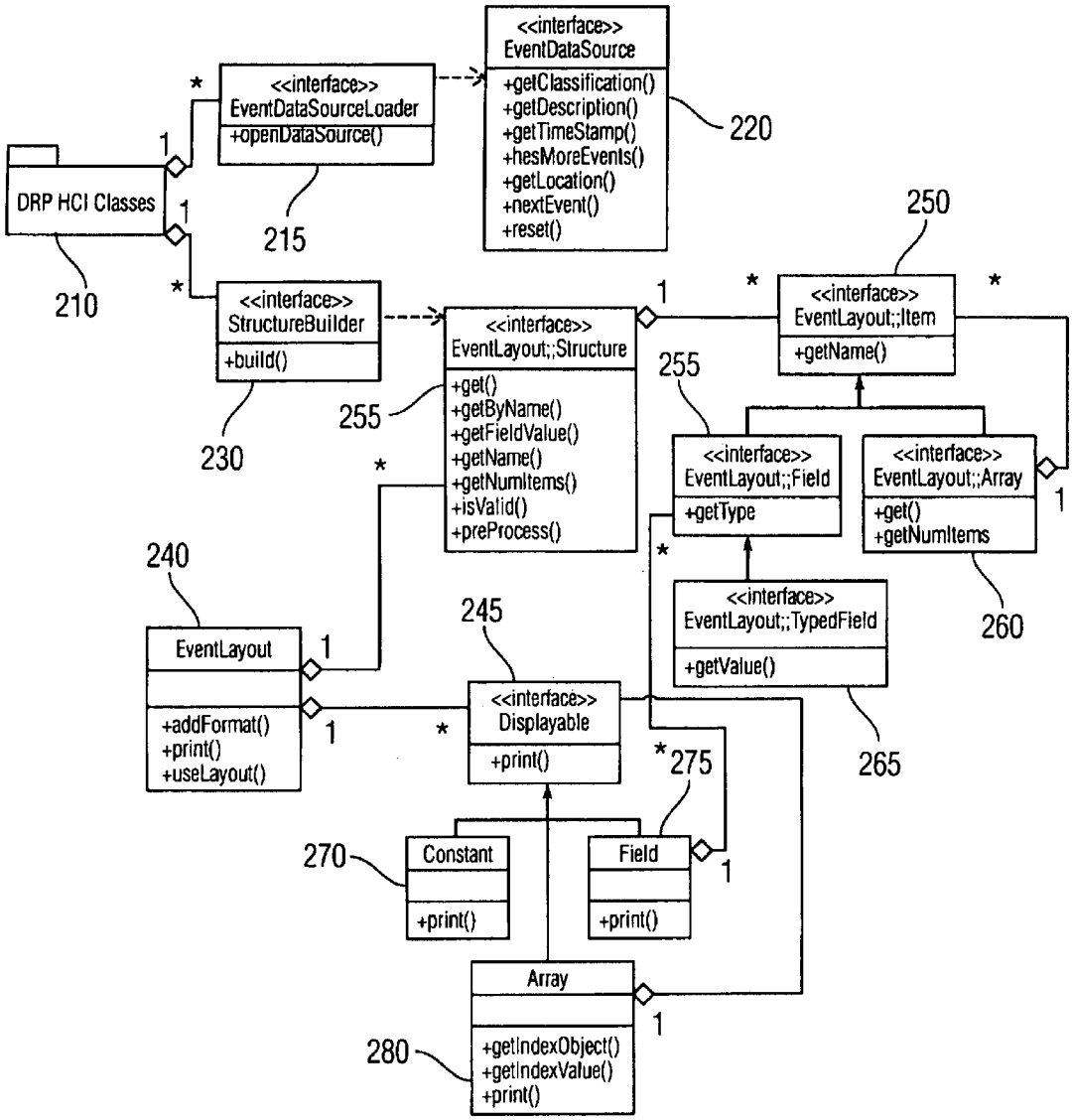
FIG. 2 is a class diagram view for the structure of objects within the data reduction component of the framework.

FIG. 2 shows a class diagram 200 for the objects within the data reduction component of the framework. A set of DRP Human Computer Interface (HCI) classes 210 consists of at least one interface 215 (for multiple loaders), which utilizes an implementation of the event data source 220, and to at least one interface structure builder 230, which utilizes on an interface event layout structure 235. The interface event layout structure consists of at least one interface event layout item 250. The interface includes at least two implementations: Interface event layout field 255 and event layout array 260. The interface event layout typed field 265 inherits from interface event layout field 255. The interface event layout array 260 may include one or more objects of the interface event layout item 250.

The object event layout 240 consists of one or more interface event layout structure 235 objects and one or more interface displayable 245 objects. There are at least three implementations of interface displayable 245. These are object constant 270, object field 275, and object array 280. Object field 275 consists of a single interface event layout field 255 object. Object array 280 consists of one or more interface Displayable 245 objects.

In the flowchart 200, solid diamonds denote aggregation between items, open triangles denote inheritance and dash arrows indicate dependency. For example, the classes set 210 is aggregated with the interfaces 215 and 230 to combine their functionalities at its penultimate block. Each interface provides block for aggregation represents a shell to implement the instructions or establish formats therein. The classes provide methods, definitions and implementation procedures (i.e., executable functions) for reporting and analyzing data. The interface 250 inherits definitions from the interface 255 and 260 to permit operation using lower levels of instructions without controlling details of those functions. The interface 220 provides an operator-defined declaration for retrieving information fields within the data.

The Loading Events sequence begins with the operator informing the DRP Human Computer Interface (HCI) to load events. The DRP HCI responds by invoking the build method on the StructureBuilder instance to construct an EventLayout::Structure in accordance with the XML definition provided. The structure of the XML and the conversion of the XML into an EventLayout::Structure occurs via some implementation-specific means.

The DRP HCI then constructs an instance of EventLayout with the newly built EventLayout::Structure. EventLayout iterates through the event display definitions contained with a separate XML structure and constructs all the Displayable elements required by this event layout. EventLayout accomplishes this by invoking methods on the EventLayout::Structure in order to obtain the correct EventLayout::Item needed for display.

The Loading Data File sequence begins with the operator informing the DRP human computer interface to load a data file. The DRP HCI responds by invoking the build method on each successive EventDataSourceLoader object until identifying a loader that can parse the provided data in the file. The EventDataSourceLoader, through some implementation-specific means, returns a new instance of EventDataSource able to parse these data.

The processing events sequence begins with the DRP operator informing the DRP HCI that processing should being. The DRP HCI then calls the EventDataSource for the MoreEvents method. If this source has more events, the DRP HCI retrieves the next event from the EventDataSource. From the event data, the DRP HCI locates the event definition able to display the extracted data. The DRP HCI then determines whether this event is valid for display, or else the event should be skipped as part of the filtering processing. This filtering is performed based upon user-supplied criteria such as event number, event sequence number, event extraction time, or the actual values within fields within the events.

For the condition in which the event is valid and should be displayed, the DRP HCI invokes the print method on the correct EventLayout object. The EventLayout object iterates through the Displayable objects contained therein and invoke the print method on each respective Displayable object. If this Displayable object actually represents a Field, the underlying EventLayout::Field contained within the Displayable object is called to return the actual value contained within the extracted data.

Figure 3:
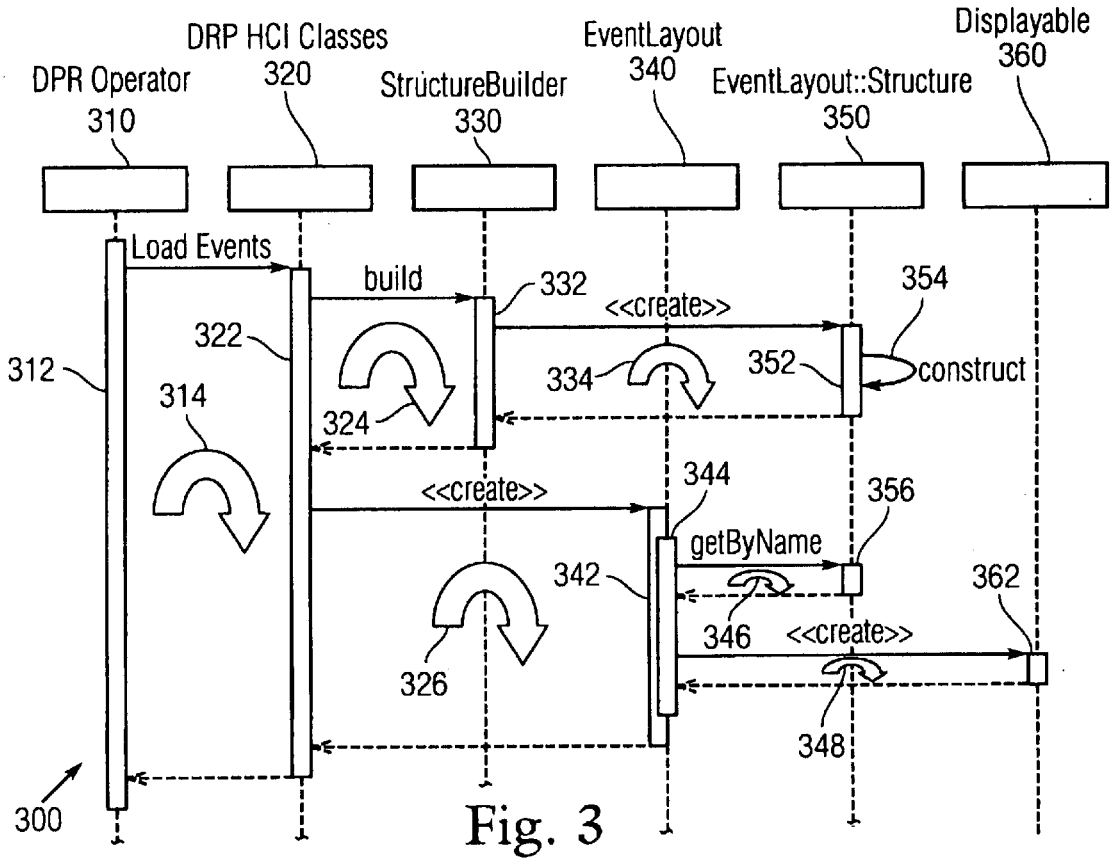
FIG. 3 is a process structure view of a sequence diagram for loading events.

FIG. 3 shows an exemplary sequence diagram 300 for loading events into the data reduction component of the framework. The sequence diagram 300 details the general flow of execution within the DRP. A DRP Operator mark 310 initiates a first trigger 312 for loading events within a first cycle 314 until completion. A DRP HCI Classes mark 320 initiates a second trigger 322 for second and third cycles 324, 326. A StructureBuilder mark 330 initiates a third trigger 332 for a fifth cycle 334. An EventLayout mark 340 initiates a fourth trigger 342 having a sub-trigger 344 for sixth and seventh cycles 346, 348.

The second cycle 324 builds structure until completion at the third trigger 332, whereas the third trigger 326 creates classes until completion at the fourth trigger 342. An EventLayout::Structure mark 350 initiates a fifth trigger 352 with a construction loop 354 and a sixth trigger 356. The fourth cycle 334 creates event layouts until completion at the fifth trigger 352. The fifth cycle 346 obtains names until completion at the sixth trigger 356. A Display mark 360 provides a seventh trigger 362. The sixth cycle 348 creates layout structures until completion at the seventh trigger 362.

Figure 4:
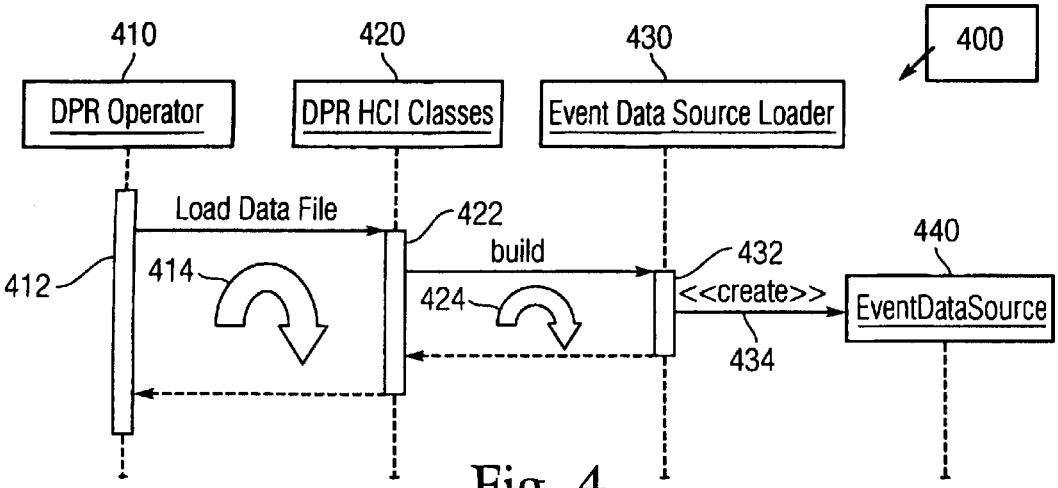
FIG. 4 is a process structure view of a sequence diagram for loading extracted data.

FIG. 4 shows an exemplary sequence diagram 400 for loading extract data into the DRP. A DRP Operator mark 410 initiates a first trigger 412 for loading data within a first cycle 414 until completion. A DRP HCI Classes mark 420 initiates the second trigger 422 for building the classes within a second cycle 424 until completion. An Event Data Source Loader mark 430 initiates a third trigger 432 that creates an Event Data Source 440.

Figure 5:
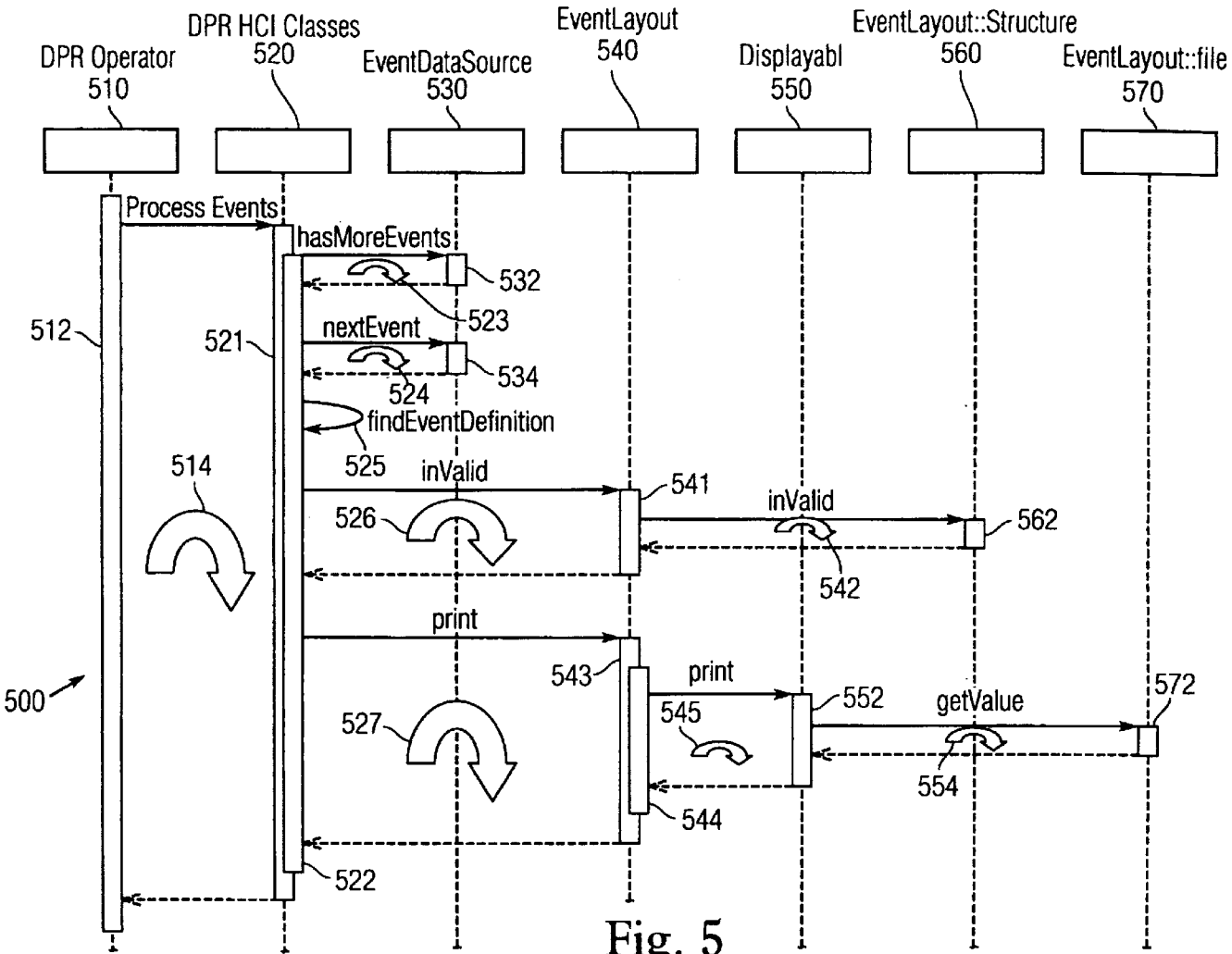
FIG. 5 is a process structure view of a sequence diagram for data reduction.

FIG. 5 shows an exemplary sequence diagram 500 for the reduction of events within the DRP. A DRP Operator mark 510 initiates a first trigger 512 for processing events within a first cycle 514 until completion. A DRP HCI Classes mark 520 initiates a second trigger 521 with a sub-trigger 522 for building classes until completion. The first cycle 514 processes events until completion at the second trigger 521. The sub-trigger 522 initiates a third cycle 523 for ascertaining More Events, a fourth cycle 524 for sequencing the Next Event, a find Event Definition loop 525, a validation fifth cycle 526 for determining event validity, and a sixth cycle 527 for printing events, all until completion.

An Event Data Source mark 530 initiates third and fourth triggers 532, 534 that respectively terminate the third and fourth cycles 523, 524. An Event Layout mark 540 initiates a fifth trigger 541 validates events in a seventh cycle 542, together with a sixth trigger 543 with a sub-trigger 544 that prints in an eighth cycle 545.

A Display mark 550 initiates a seventh trigger 552 for obtaining display values in a ninth cycle 554. An EventLayout::Structure mark 660 initiates an eighth trigger 562; and an Event Layout::file 570 initiates a ninth trigger 572. The seventh cycle 542 validates until completion at the eighth trigger 562. The eighth cycle 545 prints until completion at the seventh trigger 552, while the ninth cycle 554 obtains values until completion at the ninth trigger 572.

Figure 6:
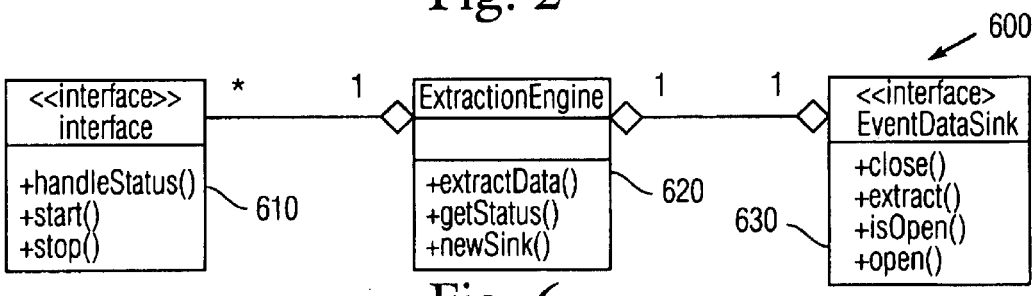
FIG. 6 is a class diagram view for the structure of objects within the data extraction component of the framework.

FIG. 6 shows an exemplary class diagram 600 for identifying interface operations and arguments. An Interface 610 operates in conjunction with an Extraction Engine 620, which interacts with an EventDataSink 630. The Interface 610 includes operations for handling status, starting and stopping. The Engine 620 obtains Data, Status and establishes a repository. The Sink 630 provides closing, extraction, status and opening operations for receiving data for storage.

Figure 7:
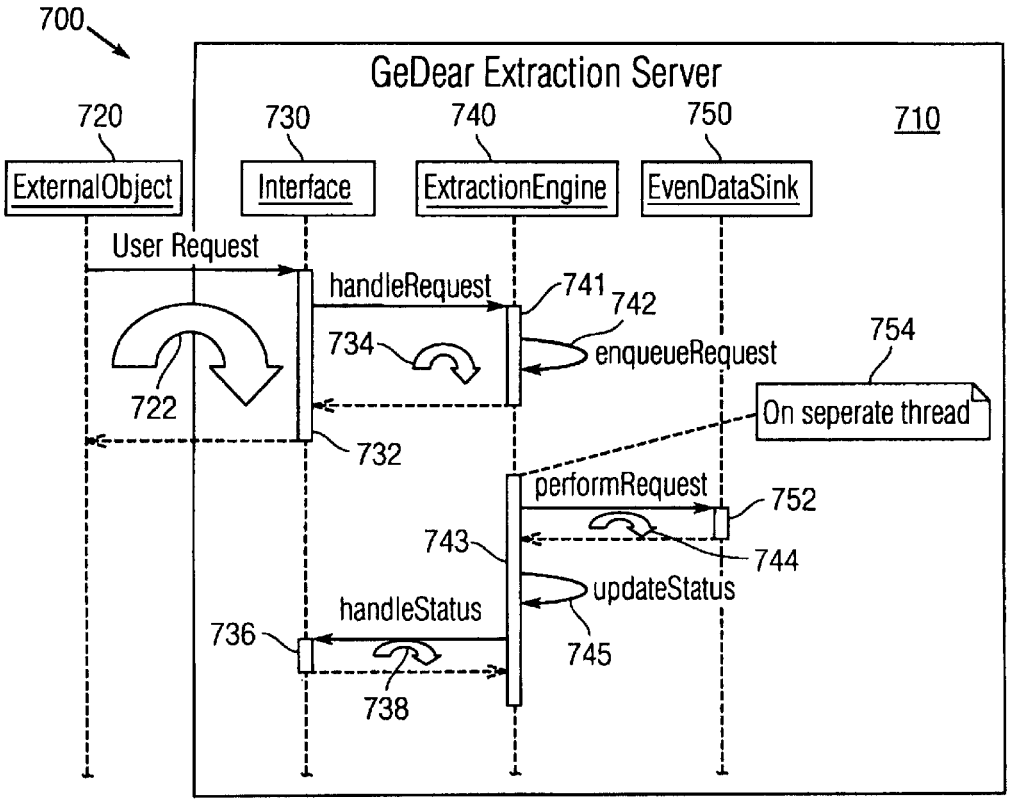
FIG. 7 is a process structure view of a data extraction server.

FIG. 7 shows an exemplary sequence model 700 for GeDEAR Extraction Server Details. A GeDEAR Extraction Server 710 receives a user request from an ExternalObject mark 720 through an external cycle 722. Within the Server 710, an Interface mark 730 initiates a first trigger 732 for handling requests in a first (internal) cycle 734, and a second trigger 736 for handling status in a second cycle 738.

An ExtractionEngine mark 740 initiates a third trigger 741 for sequencing requests in queuing loop 742, and a fourth trigger 743 for performing requests in a third cycle 744 together with updating status in an updating loop 745. An EventDataSink 750 initiates a fifth trigger 752, which completes the third cycle 744 to perform requests. A separate thread 754 can also interact with the fourth trigger 743.

Figure 8:
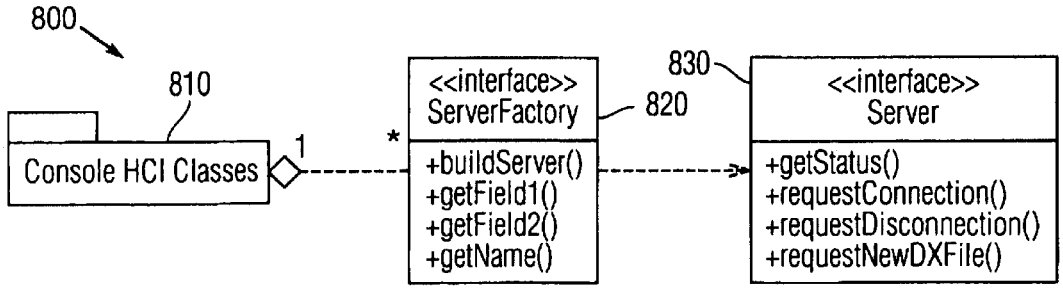
FIG. 8 is a class diagram view the structure of objects within the extraction management console component of the framework.

FIG. 8 shows an exemplary class diagram 800 for identifying HCI classes. A Console for HCI Classes 810 operates in conjunction with a ServerFactory 820, which forwards information to a Server 830. The Factory 820 builds the server, and obtains corresponding fields and names. The Server 830 obtains status and submits requests for connecting, disconnecting or obtaining exchange files.

Figure 9:
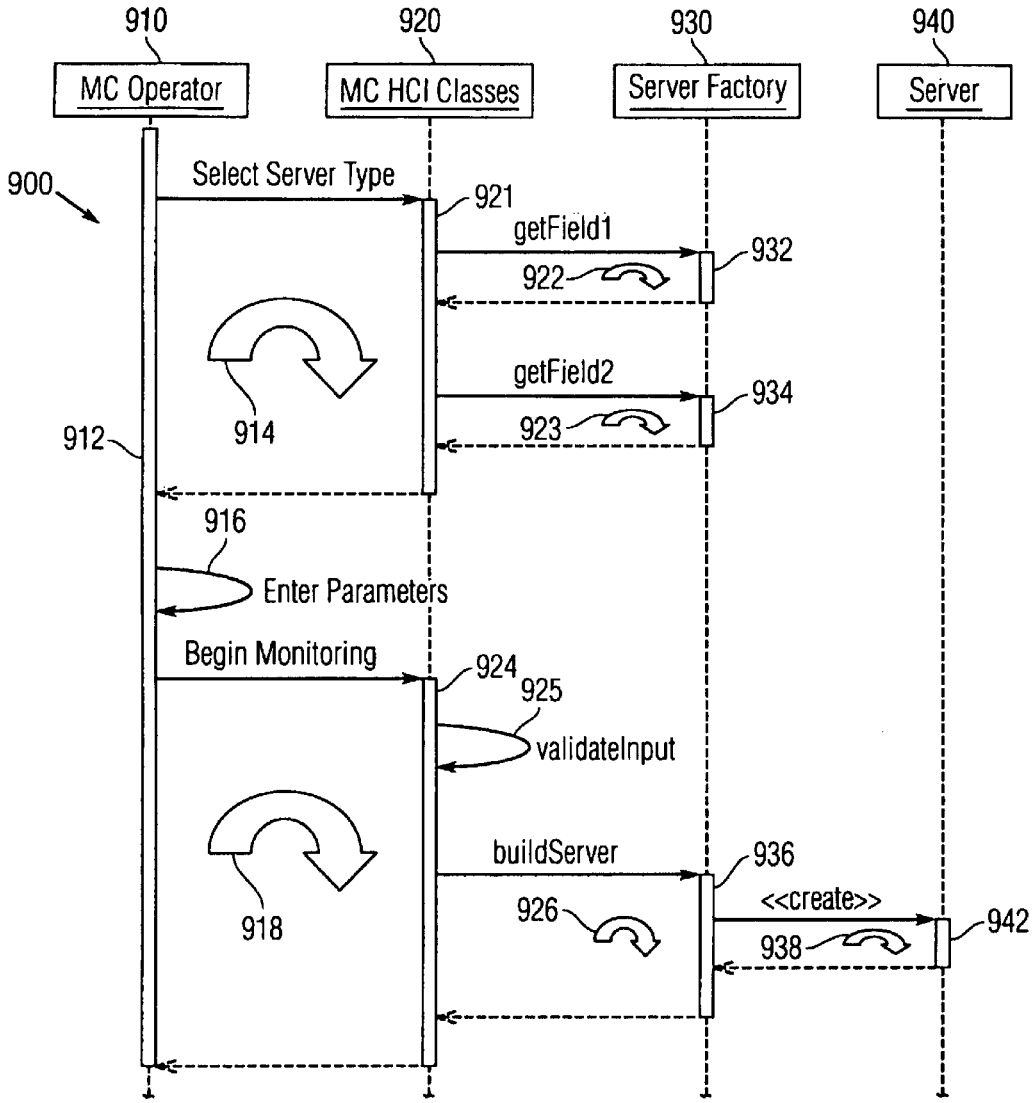
FIG. 9 is a process structure view for a management console.

FIG. 9 shows an exemplary sequence diagram 900 for Management Console (MC) Details. An MC Operator mark 910 initiates a first trigger 912 for selecting server type within a first cycle 914 until completion, enabling operator input in a parameter entry loop 916, and monitor beginning in a second cycle 918. An MC HCI Classes mark 920 initiates a third trigger 921 for getting fields in third and fourth cycles 922, 923 until completion, and initiates a fourth trigger 924 for validating input in a loop 925 and building a server in a fifth cycle 926 until completion.

The first cycle 914 selects server types until completion at the second trigger 921, and the second cycle 918 begins monitoring until completion at the third trigger 924. A ServerFactory 930 initiates fourth, fifth and sixth triggers 932, 934 and 936, the last of which creating a server in a sixth cycle 936 until completion. A Server 940 initiates a seventh trigger that provides a terminus for the sixth cycle 936.

The parameters provided or created by these operations can be summarized, as provided by FIGS. 10-15, by a series of descriptions in tabular form, with identification by name, description and implementation. These lists, or portions of an overall list are described briefly as follows.

FIG. 10 shows a first list 1000 that includes parameters with names Array 1010, Constant 1020, Displayable 1030, DRP HCI Classes 1040 and EventDataSource 1050. For example, the first two parameters represent objects that are implemented by the GeDEAR framework. FIG. 11 provides a second list 1100 that includes parameters with names EventDataSourceLoader 1110, EventLayout 1120 and EventLayout::Array 1130, all representing classes.

FIG. 12 shows a third list 1200 that includes parameters with names EventLayout::Field 1210, EventLayout::Item 1220 and EventLayout::Structure 1230. FIG. 13 indicates a fourth list 1300 that includes parameters with names EventLayout::TypedField 1310, Field 1320 and StructureBuilder 1330.

FIG. 14 shows a fifth list 1400 that includes parameters with names Interface 1410, ExtractionEngine 1420 and EventDataSink 1430. FIG. 15 shows a sixth list 1500 that includes parameters with names Console HCI Classes 1510, ServerFactory 1520 and Server 1530.

Various exemplary embodiments describe the design that enables development of GeDEAR tools, rather than particular GeDEAR applications. The following examples provide a typical usage scenario of the GeDEAR Data Reduction Program (DRP) to demonstrate the context of when processing occurs and how the operator is informed of the processing status.

The first step involves loading the extracted data. In this sequence, the operator loads a file that contains extracted data. The first phase is to inform the DRP that a data file should be loaded by selecting a file from the directory control or through the File menu. Upon selecting the appropriate file, the DRP automatically opens the file and performs the processing described in the sequence diagram 300.

Figure 16:
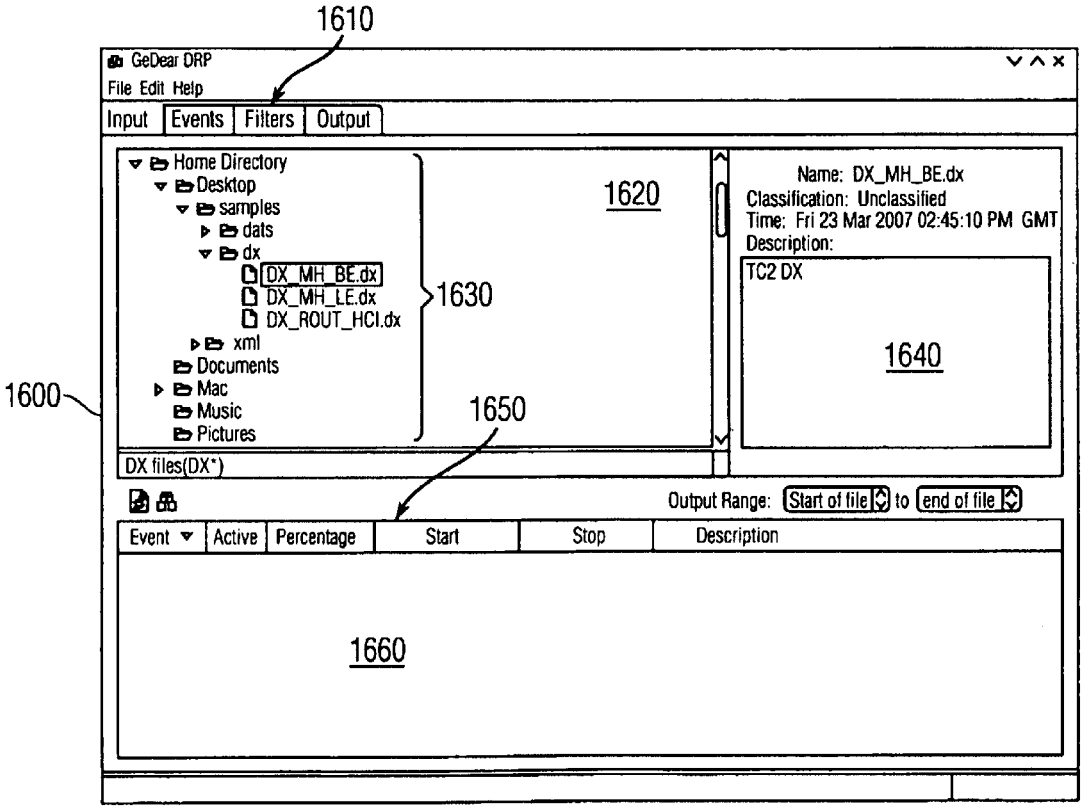

FIG. 16 shows a first exemplary GeDEAR DRP window 1600. An upper menu 1610 identifies four selections: input, events, filters and output. An upper files contents box 1620 displays the directories and files in a cascading list 1630 under the upper menu 1610, which selects "input" for this example. An auxiliary contents box 1640 is disposed to the right of the box 1620 to provide file description, with an output range provided underneath. A lower events header 1650 identifies six descriptors as a tabular header. A lower events contents box 1660 provides an area for display of summary information about the loaded file.

Upon completion of file loading, the operator may select a menu command to generate an event summary. This summary lists the events within the loaded data file, when the events occur and how often the events occur.

Figure 17:
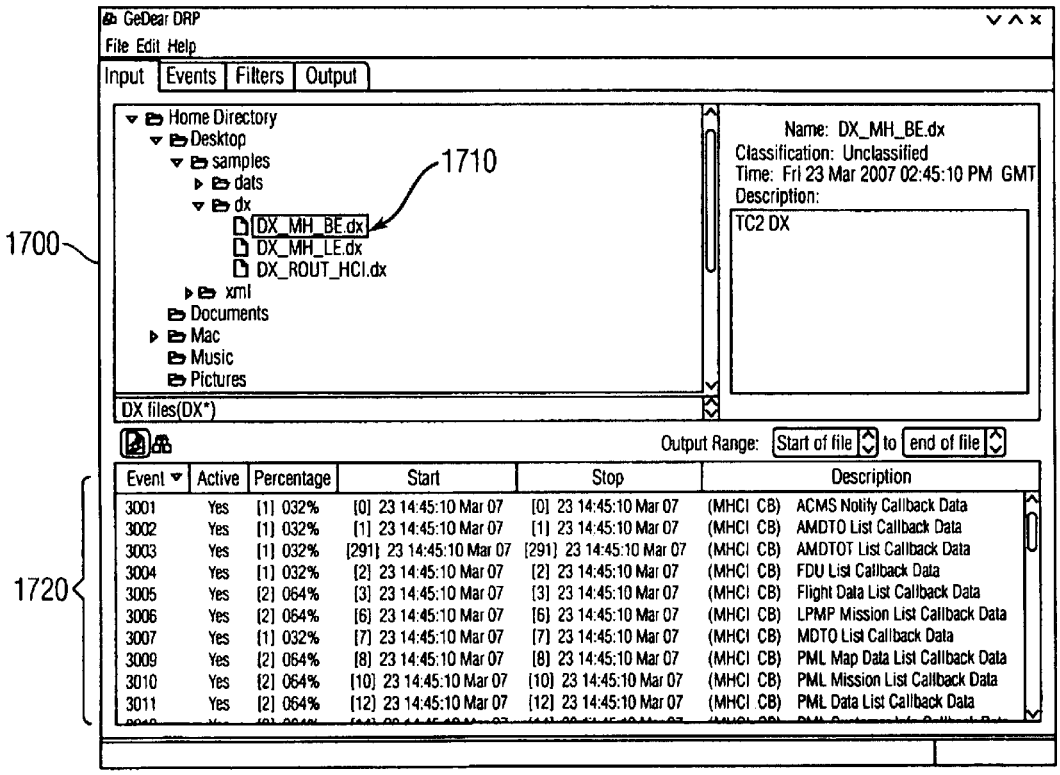

FIG. 17 shows a second exemplary GeDEAR DRP window 1700. A highlighted file 1710 can be selected within the box 1620. Events associated with the file 1710 can be displayed in the box 1660 as a list 1720 with parameters corresponding to the descriptors in the header 1650.

Figure 18:
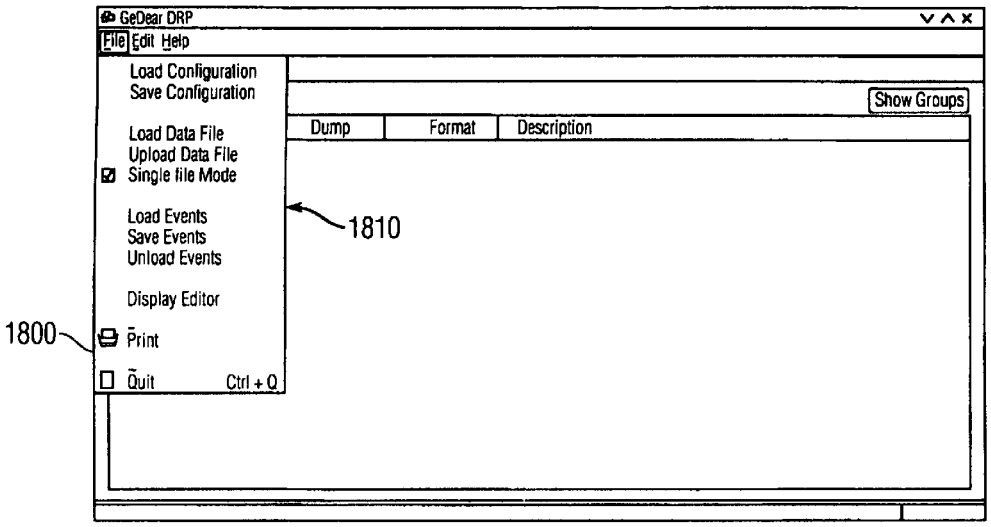

The second step involves loading the events. In this sequence, the operator loads events into the DRP to allow for their reduction and display. The event file is an XML file that describes the data and optionally defines the formatting for display in the box 1660. The first phase is to inform the DRP that events should be loaded. This can be accomplished through a file menu above the upper menu 1610 or through a load toolbar icon. FIG. 18 shows a third exemplary GeDEAR DRP window 1800 with the file menu 1810, which can be expanded. This results in the DRP providing a standard file selection box to the operator enabling selection of the event file or files to load into the DRP.

Figure 19:
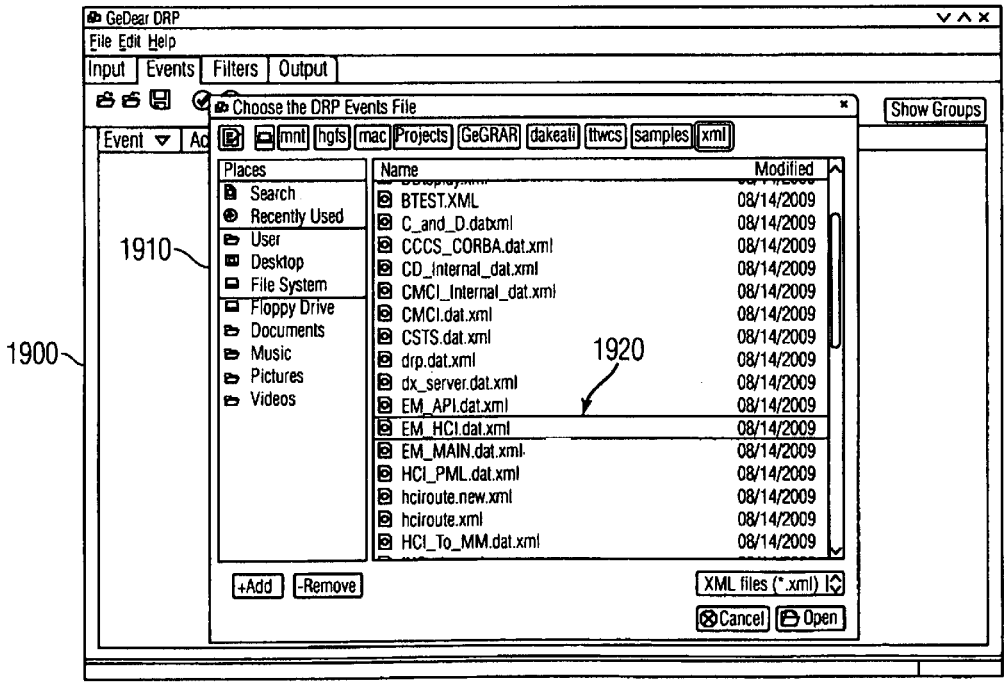

The third step is performed internal to the DRP. This step involves loading the event definitions described within the XML as prescribed in the flowchart 300. FIG. 19 shows a fourth exemplary GeDEAR DRP window 1900 in which events in the upper menu 1610 is selected. A window box 1910 provides a list of event XML files, including a highlighted line that identifies drp.dat.xml as the selected file.

Upon loading these events, the operator can be provided with a listing of all the events known to the DRP. FIG. 20 shows a fifth exemplary GeDEAR DRP window 2000. The events are displayed as a list 2010 within an expanded events content box 1660, with associated parameters listed under their corresponding parameters in the header 1650.

Figure 21:
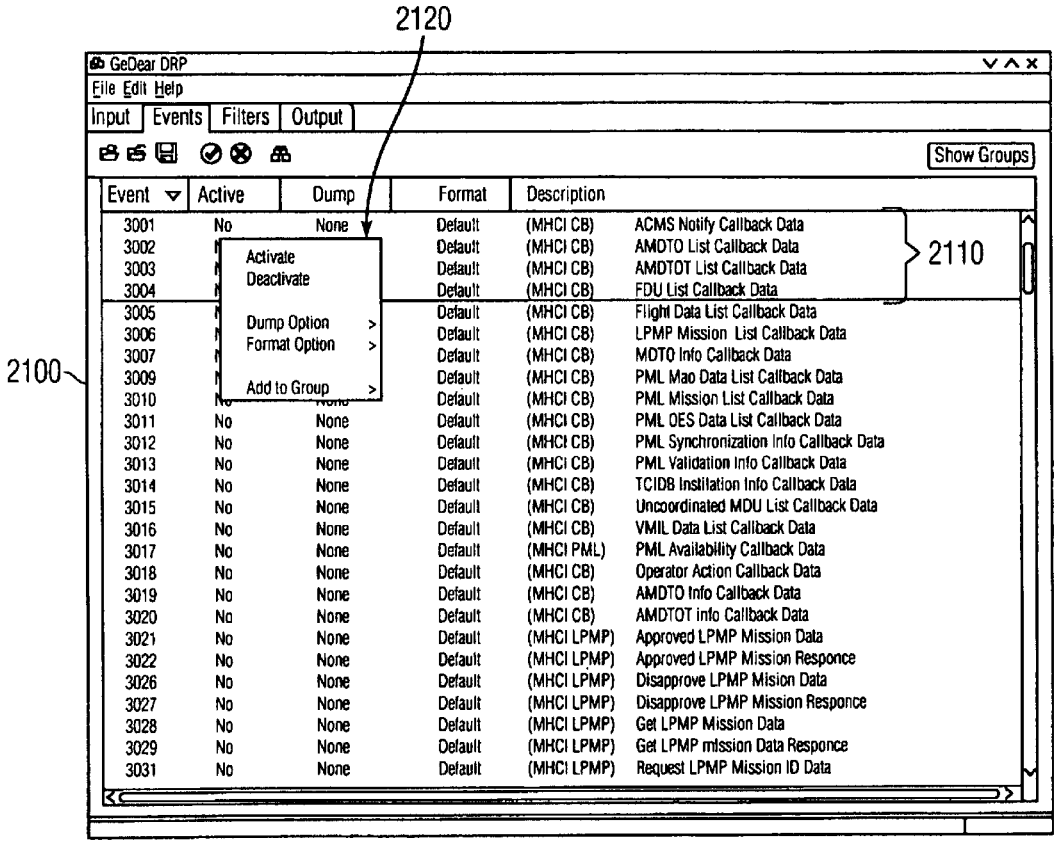

The fourth step involves the operator activating at least one event after the events have been loaded. An active event represents the event to be reduced from the extracted data and displayed to the operator. An event may be activated by either selecting the activate button or through right-click context menus. FIG. 21 shows a sixth exemplary GeDEAR DRP window 2100. A selection 2110 of the events shown in the list 2010 can be distinguished by highlighting. Activation opens a menu box 2120 that includes an "activate" command, from which FIG. 22 displays a seventh exemplary GeDEAR DRP window 2200. The DRP denotes those events that are active in the events table.

Figure 23:
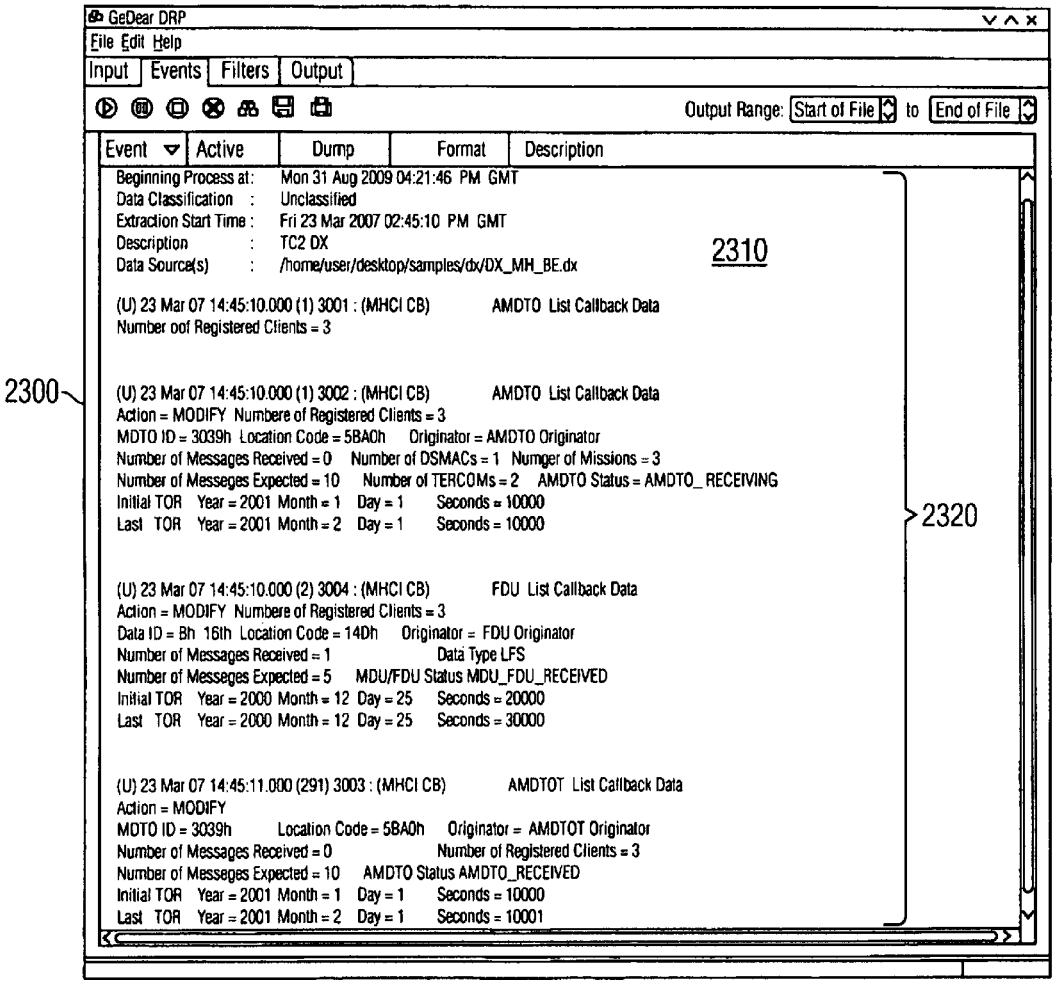

The fifth step involves reducing the data. With the extracted data file selected and events loaded the operator may reduce the data. This causes the DRP to display the active events within the data file in by performing the processing described in sequence diagram 500. FIG. 23 shows an eighth exemplary GeDEAR DRP window 2300. Selection of the "output" in upper menu 1610 yields within a window box 2310 a descriptor list 2320 identifying actions performed from activation of the selected files.

The GeDEAR framework has the following advantages over the old methods:

a. Well defined separation between the data formats and software interfaces used within the system and the actual extraction, reduction, and analysis capabilities;

b. Decoupling of the extraction and the reduction and analysis capabilities;

c. Independent of the hardware used by the system;

d. Independent of the software used by the system; including operating system, interface protocols, or programming language e. Dynamic definition and application of the event descriptions to the data reduction and analysis capabilities;

f. Run-time loading of data formats, software interfaces, and output customizations used by the framework; and g. Run-time modification of extraction, reduction, and analysis functionality provided by the framework.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An automated instruction execution processor to process data from a computer that executes an application program, said processor comprising:

an extraction engine for retrieving execution data from the application program and recording said execution data to nonvolatile memory as extract data;

a reduction program module for reading said extract data from said memory and reducing said extract data into human readable format as reduce data; and an analysis program module for analyzing said reduce data in accordance with operator-provided instructions and producing event data that identify at least one sequence associated with said execution data, said sequence presenting a format that includes first and second marks, said first mark initiating a trigger to process an event within a cycle until completion at said second mark.

2. The processor according to claim 1, further comprising:

a management console for displaying said retrieving, recording, reading, reducing, analyzing and producing processes.

3. The processor according to claim 1, wherein said analysis program module includes an extended markup language (XML) structure for building a template to display said event data.

4. The processor according to claim 1, wherein said analysis program module further filters said sequence for acceptance with validity and to skip absent said validity.

5. The processor according to claim 1, wherein said extraction engine further includes a classes assigner for categorizing said execution data into classes.

6. The processor according to claim 5, wherein said reduction program module further includes a structure builder for formatting said extract data.

7. The processor according to claim 6, wherein said reduction program module further includes an event layout builder for formatting said event data.

8. The processor according to claim 1, wherein said format further includes a loop for processing said event data at said first mark.

9. A method for processing data from a computer that executes an application program, said method comprising:

retrieving execution data from the application program via an extraction engine;

recording said execution data to nonvolatile memory as extract data via said engine;

reading said extract data from said memory via a reduction program;

reducing said extract data into human readable format as reduce data via said reduction program;

analyzing said reduce data via an analysis program, said analyzing being in accordance with operator-provided instructions;

producing event data that identify at least one sequence associated with said reduce data via said analysis program; and displaying said sequence in a format that includes first and second marks, said first mark initiating a trigger to process an event within a cycle until completion at said second mark.

10. The method according to claim 9, further comprising:

displaying said retrieving, recording, reading, reducing, analyzing and producing processes via a management console.

11. The method according to claim 9, wherein said producing operation further includes building a template to display said event data via said analysis program, said template based on an extended markup language (XML) structure.

12. The method according to claim 9, wherein said analyzing operation further includes filtering said sequence for acceptance via said analysis program, said filtering operation to accept said sequence with validity and to skip said sequence absent said validity.

13. The method according to claim 9, wherein said extraction engine further includes categorizing said execution data into classes via a classes assigner.

14. The method according to claim 13, wherein said reduction program further includes formatting said extract data via a structure builder.

15. The method according to claim 14, wherein said reduction program further includes formatting said event data via an event layout builder.

16. The method according to claim 9, wherein said format further includes a loop for processing said event data at said first mark.

* * * * *